(12) United States Patent
Chang et al.

(10) Patent No.: US 8,257,834 B2
(45) Date of Patent: Sep. 4, 2012

(54) PROCESS FOR JOINING STAINLESS STEEL PART AND SILICON NITRIDE CERAMIC PART AND COMPOSITE ARTICLES MADE BY SAME

(75) Inventors: Hsin-Pei Chang, New Taipei (TW);
Wen-Rong Chen, New Taipei (TW);
Huann-Wu Chiang, New Taipei (TW);
Cheng-Shi Chen, New Taipei (TW);
Wen-Feng Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/188,068

(22) Filed: Jul. 21, 2011

(65) Prior Publication Data
US 2012/0135268 A1 May 31, 2012

(30) Foreign Application Priority Data
Nov. 30, 2010 (CN) .......................... 2010 1 0565691

(51) Int. Cl.
*B32B 15/04* (2006.01)
*B32B 15/18* (2006.01)
*B32B 18/00* (2006.01)

(52) U.S. Cl. ........ 428/627; 428/660; 428/663; 428/685; 428/215; 428/336; 428/450

(58) Field of Classification Search .................. 428/610, 428/627, 660, 663, 681, 682, 683, 684, 685, 428/212, 213, 215, 216, 220, 332, 335, 336, 428/446, 450
See application file for complete search history.

(56) References Cited

U.S. PATENT DOCUMENTS
5,161,908 A * 11/1992 Yoshida et al. ................. 403/29
* cited by examiner

*Primary Examiner* — Michael La Villa
(74) *Attorney, Agent, or Firm* — Altis Law Group, Inc.

(57) ABSTRACT

A process for joining a stainless steel part and a silicon nitride ceramic part comprising: providing a stainless steel part, a SiN ceramic part, a Mo foil and a Fe foil; placing the SiN ceramic part, the Mo foil, the Fe foil, and the stainless steel part into a mold, the Mo foil and the Fe foil located between the SiN ceramic part and the stainless steel part, the Mo foil abutting the SiN ceramic part, the Fe foil abutting the stainless steel part and the Mo foil; placing the mold into a chamber of an hot press sintering device, heating the chamber and pressing the stainless steel part, the SiN ceramic part, the Mo foil, and the Fe foil at least until the stainless steel part, the SiN ceramic part, the Mo foil and the Fe foil form a integral composite article.

5 Claims, 2 Drawing Sheets

US 8,257,834 B2

PROCESS FOR JOINING STAINLESS STEEL PART AND SILICON NITRIDE CERAMIC PART AND COMPOSITE ARTICLES MADE BY SAME

The disclosure of the listed application is incorporated by reference in this instant application. The listed application has the same assignee as the instant application.

| Ser. No. | Title | Inventors | Current Status |
|---|---|---|---|
| 13/158,572 | PROCESS FOR JOINING STAINLESS STEEL PART AND TITANIUM CARBIDE CERAMIC PART AND COMPOSITE ARTICLES MADE BY SAME | HSIN-PEI CHANG et al. | Pending |

BACKGROUND

1. Technical Field

The exemplary disclosure generally relates to a process for joining a metal part and a ceramic part, especially to a process for joining a stainless steel part and a silicon nitride ceramic part, and a composite article made by the process.

2. Description of Related Art

It is important to be able join stainless steel parts and silicon nitride ceramic parts. However, due to distinct physical and chemical properties, it can be difficult to join stainless steel and silicon nitride ceramic using traditional bonding methods such as braze welding, fusion welding, solid diffusion bonding.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary process for joining stainless steel part and silicon nitride ceramic part, and composite article made by the process. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
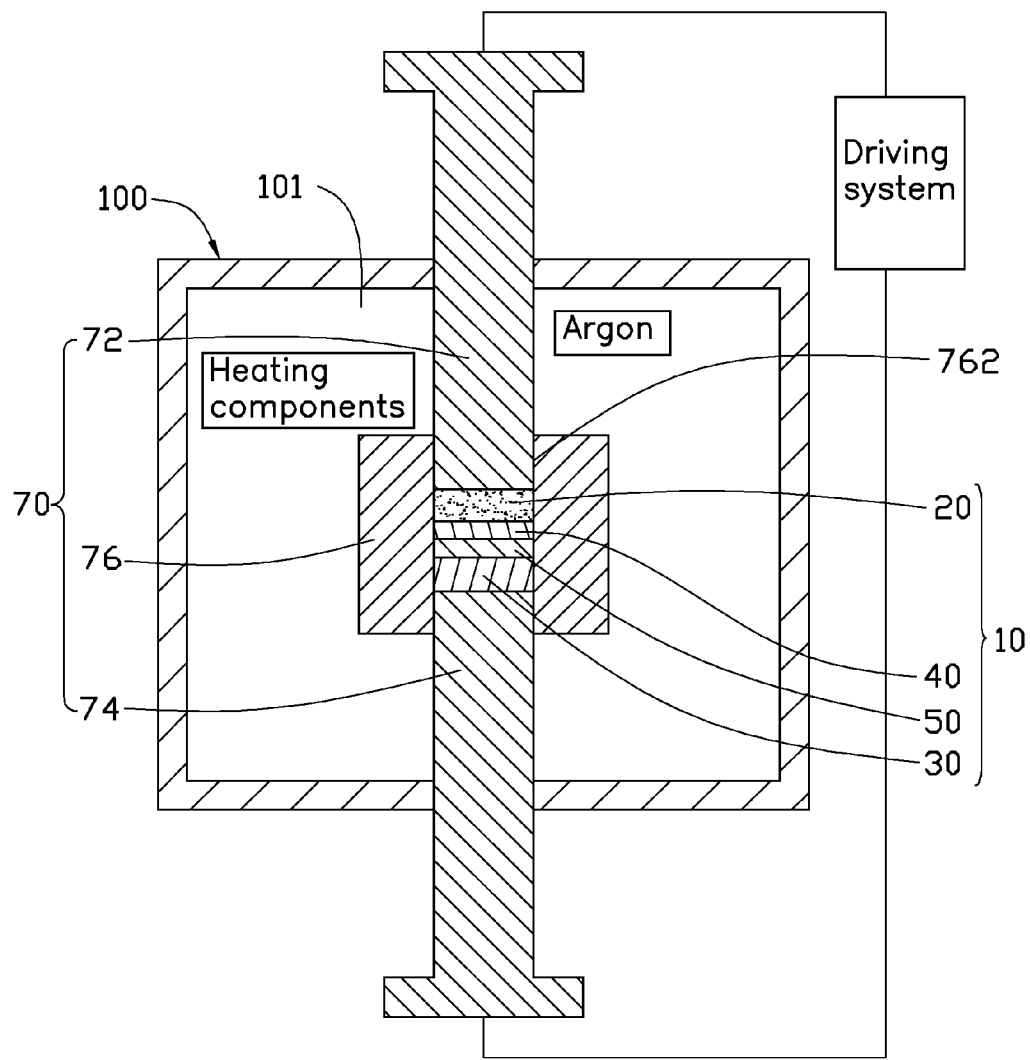
FIG. 1 is an exemplary embodiment of a schematic cross-sectional view of an example of a spark plasma sintering device for implementing the present process.

The process according to the present disclosure is generally implemented by a spark plasma sintering (SPS) device as illustrated in FIG. 1.

Figure 2:
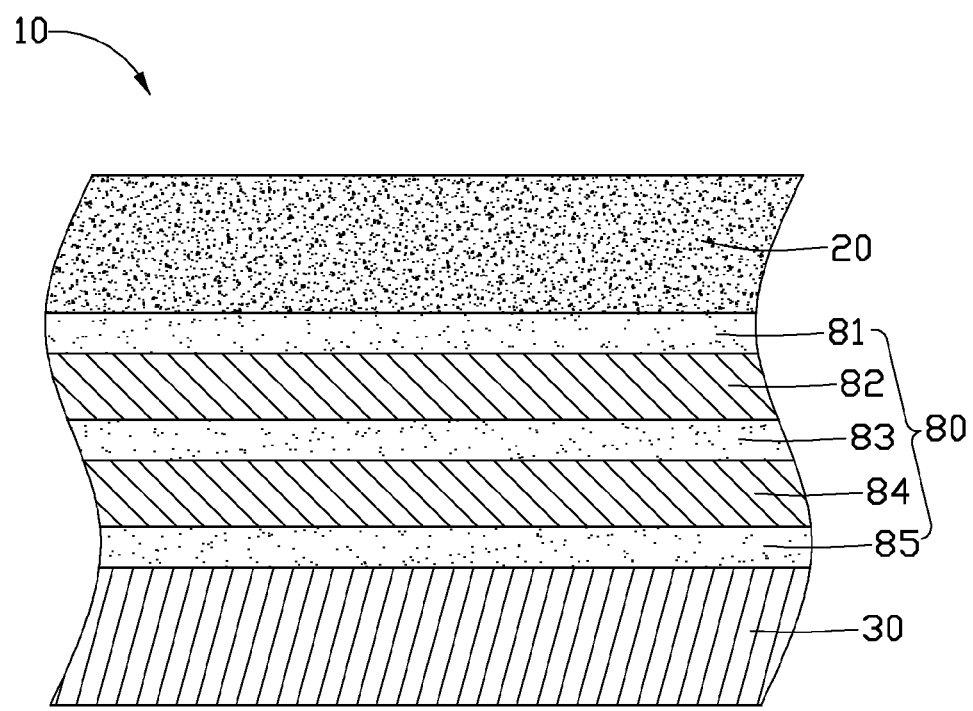
FIG. 2 is a cross-sectional view of an exemplary embodiment of the present article made by the present process.

Referring to FIGS. 1 and 2, an exemplary process for joining a stainless steel part and an silicon nitride ceramic part may include the following steps.

A ceramic part 20 made of silicon nitride ceramic, a metal part 30 made of stainless steel, and an intermediate member in provided. The intermediate member includes two foils, a molybdenum (Mo) foil 40 and an Fe foil 50. The intermediate member is used as a joining medium between the surfaces of the ceramic part 20 and the metal part 30. the Mo foil 40 has a thickness of about 0.2~0.4 mm. the Fe foil 50 has a thickness of about 0.2 to about 0.4 mm.

A clamping mold 70 is used to hold the SiN ceramic part 20, the stainless steel part 30, the Mo foil 40 and the Fe foil 50. The clamping mold 70 includes a pressing board 72, a corresponding supporting board 74 and a receiving board 76. The receiving board 76 defines a cavity 762 running through the upper/bottom surface to receive the SiN ceramic part 20, the stainless steel part 30, the Mo foil 40 and the Fe foil 50. The pressing board 72 and the corresponding supporting board 74 extend towards the cavity 762 from opposing directions and can be moved relative to the cavity 762 by a driving system such as hydraulic pressure system. The SiN ceramic part 20, the Mo foil 40, the Fe foil 50 and the stainless steel part 30 are placed into the cavity 762 and clamped by the pressing board 72 and the corresponding supporting board 74. The Mo foil 40 and the Fe foil 50 are inserted between the SiN ceramic part 20 and the stainless steel part 30. The SiN foil 40 abuts against the SiN ceramic part 20, the Fe foil 50 abuts against the stainless steel part 30. The pressing board 72 and the corresponding supporting board 74 from two opposite sides, brings the surfaces of the parts to be joined into tight contact, for compressing the SiN ceramic part 20, the Mo foil 40, the Fe foil 50 and the stainless steel part 30.

A clamping mold 70 made of electro-conductive material, such as graphite, is provided as shown in FIG. 1. The mold 70 includes an upper pressing head 72, a lower pressing head 74, and a middle part 76. The middle part 76 defines a cavity (not shown) for accommodating the parts to be joined. The ceramic part 20, the metal part 30, the Mo foil 40 and the Fe foil 50 are placed into the mold 70 sequentially in a stacked die. The Mo foil 40 and the Fe foil 50 are inserted between the ceramic part 20 and the metal part 30. The upper pressing head 72 and the lower pressing head 74 from two opposite sides, bring the surfaces of the parts to be joined in tight contact, for compressing the ceramic part 20, metal part 30, Mo foil 40 and Fe foil 50.

An hot press sintering device 100 including a chamber 101 is provided. The clamping mold 70 is placed into the chamber 101. The vacuum level inside the chamber 101 is set to about $10^{-3}$ Pa to about $9 \times 10^{-3}$ Pa. Argon (Ar) is fed into the chamber 101 to maintain the chamber 101 pressure in a range of about 0.3-0.6 MPa. The pressing board 72 and the corresponding supporting board 74 press toward each other at about 5 Mpa to firmly clamp the SiN ceramic part 20 and the stainless steel part 30. Then, the chamber 101 is heated at a rate of about 1-20 degrees Celsius per minute (° C./min). When the temperature of the chamber 101 reaches to about 300° C., the clamping pressure applied by the boards 72, 74 steadily increases, until the temperature of the chamber 101 reaches to about 1000-1200° C., and the clamping pressure reaches to about 10-40 Mpa. The pressure and heat are maintained in their respective peak ranges for about 20-50 min, so that the Mo foil 40 and the Fe foil 50 will interact with each other, and the Mo foil 40 interacts with the SiN ceramic part 20, and the Fe foil 50 interacts with the stainless steel part 30. Accordingly, the SiN ceramic part 20 and the stainless steel part 30 are connected by the Mo foil 40 and the Fe foil 50 to form a composite article 10. The composite article 10 is removed after the chamber 101 is cooled.

Owing to the present process, a final, permanent joint, of great strength is obtained. The process requires a short hold time and a low vacuum level of the sintering chamber 13, thus saving significant time and energy.

Referring to FIG. 2, In the process of making the composite article 10, the Mo foil 40 and the Fe foil 50 act as intermediate layers to form a joining layer 80 that connect the ceramic part 20 and the metal part 30. The heat expansion rate of ceramic part 20 is approximately equal to that of the Mo foil 40, thus the metal part 20 can substantially connect with the Mo foil 40. The heat expansion rate of the metal part 30 is approximately equal to that of the Fe foil 50, thus the metal part 30 can substantially connect to the Fe foil 50. Furthermore, the combination of the Mo foil 40 and the Fe foil 50 to form the joining layer 80 results in a joining layer 80 having a rate of heat expansion that gradually changes from one end to the other. Therefore, the metal part 20 is securely connected with the metal part 30 and more able to cope with temperature changes.

The composite article 10 manufactured by the present process includes the ceramic part 20, the metal part 30 and a multi-layered joining layer 80 connecting the ceramic part 20 to the metal part 30. The joining layer 80 is formed by placing the Mo 40 and the Fe foil 50 between the ceramic part 20 and the metal part 30, and then heating and pressing the ceramic part 20 and the metal part 30 as previously described. The various layers of the joining layer 80 result from differing reactions between the metal part 30, the Mo foil 40, the Fe foil 50, and the ceramic part 20.

In particular, the joining layer 80 includes:

a) a first transition layer 81: The first transition layer 81 mainly includes compounds comprised Mo element and C element. The compounds result from chemical reactions between adjacent portions of the ceramic part 20 and the Mo foil 40;

b) a Mo layer 82: The Mo layer 82 results from portions of the Mo foil 40 that do not react with either the ceramic part 20 or the Fe foil 50;

c) a second transition layer 83: The second transition layer 83 is located between the Mo layer 82 and the Fe layer 84. The second transition layer 83 mainly includes chemical compounds comprising Mo element and Fe element, and Mo with Fe solid solutions. The compounds and solutions result from chemical reactions between adjacent portions to the Mo foil 40 and Fe foil 50;

d) an Fe layer 84: The Fe layer 84 results from portions of the Fe foil 50 that do not react with either the Mo foil 40 or the metal part 30;

e) a third transition layer 85: The third transition layer 85 is located between the Fe layer 84 and the metal layer 30 and connects the Fe layer 84 and the ceramic layer 30. The third transition layer 85 mainly includes Fe solid solutions, The compounds and resulting from chemical reactions between adjacent portions of the Fe foil 50 and the metal part 30.

The thermal expansion rate of the joining layer 80 gradually changes from a value close to that of the ceramic part 20 (in the area of 81) to a value close to that of metal part 30 (in the area of 85). This results in a composite article 10 well suited to temperature changes due to the gradual, rather than abrupt, changes in its internal thermal expansion rates.

The joining part 80 of the composite article 100 has no cracks or apertures, and has a smooth surface. The metal/ceramic interface of the composite article 100 has a shear strength of about 80 to about 150 MPa. In addition, it has a tensile strength of about 60 MPa to about 100 MPa.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A composite article, comprising:
a silicon nitride ceramic part,
a stainless steel part, and
a connecting layer connecting the silicon nitride ceramic part to the stainless steel part, wherein the connecting layer is formed by placing a Mo foil and a Fe foil between the silicon nitride ceramic part and the stainless steel part with the Mo foil abutting the silicon nitride ceramic part and the Fe foil abutting the stainless steel part, then heating and pressing the silicon nitride ceramic part, the stainless steel part, the Mo foil and the Fe foil.

2. The composite article as claimed in claim 1, wherein the connecting layer includes a first transition layer adjacent the silicon nitride ceramic part, a Mo layer, a second transition layer, a Fe layer, and a third transition layer adjacent the stainless steel part, and in that order.

3. The composite article as claimed in claim 2, wherein the second transition layer located between the Mo layer and the Fe layer mainly includes compounds comprised Mo element and Fe element, and Fe—Mo alloy solid solutions.

4. The composite article as claimed in claim 2, wherein the third transition layer located between the Fe layer and the stainless steel layer mainly includes Fe solid solutions.

5. The composite article as claimed in claim 2, wherein the first transition layer and the second transition layer and third transition layer each has a thickness of about 10~20 μm.

* * * * *